United States Statutory Invention Registration [19]

[11] Reg. Number: H772

Owens [43] Published: Apr. 3, 1990

[54] POWER SOURCE CONVERTER

[75] Inventor: David J. Owens, Bel Air, Md.

[73] Assignee: The United States of America as represented by the Secretary of the Army, Washington, D.C.

[21] Appl. No.: 413,813

[22] Filed: Sep. 28, 1989

[51] Int. Cl.[4] ..... H02M 3/02

[52] U.S. Cl. ..... 307/151

*Primary Examiner*—Thomas H. Tarcza
*Assistant Examiner*—Linda J. Wallace
*Attorney, Agent, or Firm*—Anthony J. Lane; Edward Goldberg; Michael C. Sachs

[57] ABSTRACT

A power source converter apparatus that is the structural and functional equivalent of a typical internally stored battery, such as a lithium organic cell. The converter has a shape and size that conforms to that of the battery being replaced. The converter includes a pair of output terminals that can make electrical contact with appropriate elements in the unit in the same manner as did the battery it replaces and a pair of input terminals accessible to the exterior of the unit for connection to an external power source. Internally of the converter body, there is mounted an electronic circuit to be used as a power conditioner and a voltage regulator for performing the proper DC-to-DC voltage conversion to ensure the necessary voltage at the output terminals. A threaded cap is fixed to the converter for use in covering the opening in the battery housing.

12 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

11
13
14
15
16
17
19
21
23
25
27
31
33
35
36
37
39
41
43
45
46
47
48
49
51
52
53
55
56
57
59
61
62
63
64
65
66
67
68
69
81

POWER SOURCE CONVERTER

The invention described herein may be manufactured, used, and licensed by or for the Government for governmental purposes without the payment to me of any royalty thereon.

BACKGROUND OF THE INVENTION

1. Field of the Invention

The present invention relates to a power source converter apparatus which directly replaces an internally stored battery of an electronic unit so that the unit may be operated from a different, external power source such as a vehicle battery.

2. Description of the Prior Art

In the field of electronics, there are numerous battery powered units that can operate on only one type of internally stored battery. The required battery will usually have a specific size, configuration, voltage, etc. In some cases, the type of battery required to operate a specific unit imposes certain restrictions on the overall use and operation of the unit. For example, in military equipment, one popular type of internally stored DC power source is the lithium organic cell, a battery that often imposes severe limitations on the use of the units in which they are placed. More specifically, the Litton DCT unit, a popular, hand-held digital communications terminal, is normally operated with a 9-volt lithium organic cell. Military restrictions prevent the use of the Litton DCT unit in certain enclosed areas because of the potential hazard to personnel in the event of improper handling. Consequently, in the past, the Litton DCT units and other like devices were normally stored or used only outside of non-authorized areas. In addition to the obvious inconvenience created, there are times when specific important tasks involving the inputting of critical data cannot be performed without gaining access to the non-authorized areas.

Although those concerned with the use or development of such battery-operated units as the Litton DCT unit have long recognized the problems often imposed by the use of certain internally stored batteries, no practical solution has yet been devised.

SUMMARY OF THE INVENTION

The general purpose of this invention is to provide a power source converter that can be used in a unit to replace an internally stored battery so that the unit may be operated safely from an external battery. To attain this, the present invention employs a power source converter apparatus that is the structural and functional equivalent of a typical internally stored battery, such as a lithium organic cell.

More specifically, the converter of the present invention has a shape and size that conforms to that of the battery being replaced. The converter also includes a pair of output terminals that can make electrical contact with appropriate elements in the unit in the same manner as did the battery it replaces. The converter further includes input terminals accessible to the exterior of the unit for connection to an external power source. Internally of the converter body, there is mounted an electronic circuit to be used as a power conditioner and a voltage regulator for performing the proper DC-to-DC voltage conversion to ensure the necessary voltage at the output terminals. The major portion of the converter body is made of a thermally conductive material, such as aluminum, to act as a heat sink for conducting heat away from the converter circuit which has heat generating elements therein.

It is, therefore, an object of the present invention to provide a DC power source converter that may be used as a replacement for an internally stored battery.

Another object is to provide a DC power converter that is the functional and physical equivalent of an existing DC power source, such as a lithium organic battery configured to power a Litton DCT.

Other objects and many of the attendant advantages of this invention will be readily appreciated as the same becomes better understood by reference to the following detailed description when considered in connection with the accompanying drawings in which like reference numerals designate like parts throughout the figures thereof.

DETAILED DESCRIPTION OF THE PREFERRED EMBODIMENT

Figure 1:
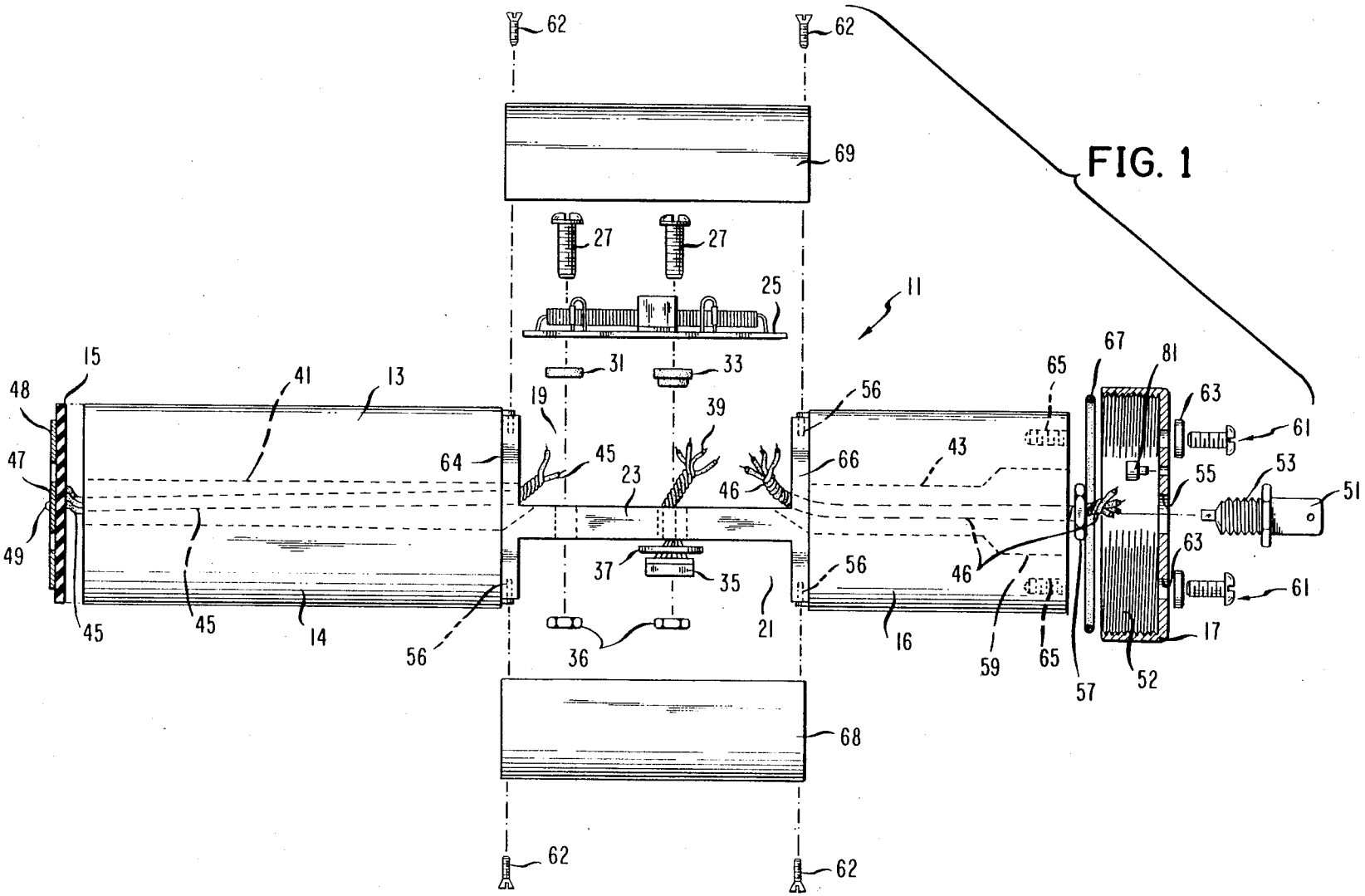
FIG. 1 is an exploded view of the preferred embodiment.
Figure 2:
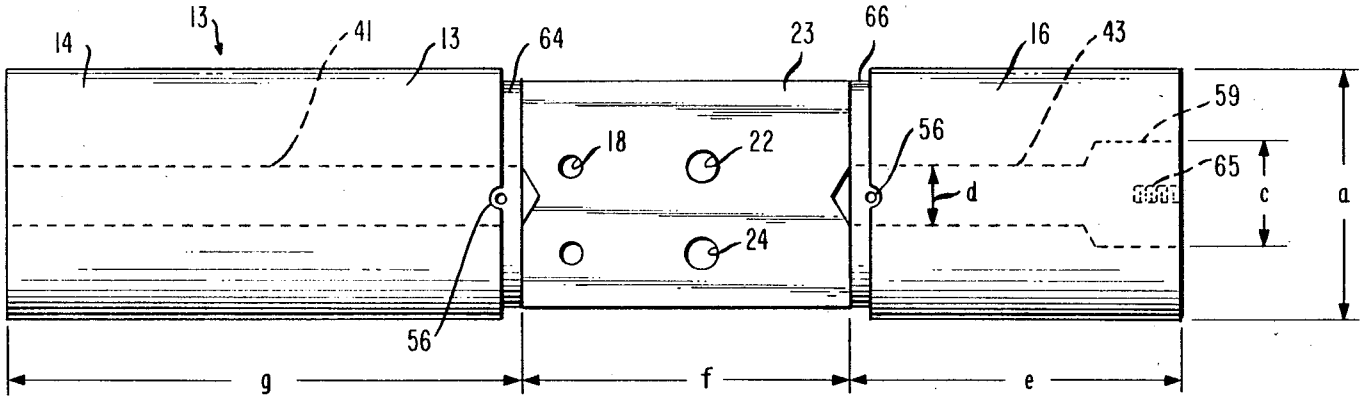
FIG. 2 is a top plan view of a portion of the device shown in FIG. 1.

Referring now to the drawings, there is shown a power source converter 11 having a body 13, with a contactor plate 15 and an end cap 17 mounted at opposite ends thereof. The body 13 is generally dumbell shaped with enlarged portions 14, 16 separated by a flat platform 23 to form a pair of chambers 19, 21. A circuit board assembly 25 is mounted in chamber 19 and is fixed to one side of platform 23 by bolts 27 that pass through assembly 25 and openings 18, 24 in platform 23. A pair of insulating spacers 31, 33 are placed between assembly 25 and platform 23. On the other side of platform 23 in chamber 21, a circuit element 35 (voltage regulator) is fixed by one of a pair of nuts 36 that secure bolts 27. Circuit element 35 is insulated from body 13 by an insulating washer 37. A plurality of electrical conductors 39 pass through opening 22 in platform 23 from circuit element 35 to assembly 25. Element 35, assembly 25 and conductors 39 are part of a circuit 71 that will be described in greater detail below with respect to FIG. 8.

Axial through-holes 41, 43 extend axially through portions 14, 16, respectively, from either end thereof to chamber 19. A pair of electrical conductors 45 pass through hole 41 to make a proper electrical connection between assembly 25 and a pair of terminals 47, 48 on contactor plate 15.

Contactor plate 15 is preferably fabricated by depositing conductive material, such as copper, on one side of a typical printed circuit board and etching the inner terminal 47 and outer annular terminal 48. Inner terminal 47 includes an alignment bead 49 that cooperates with a contact spring 88 (FIG. 3) located inside the battery housing 87. The bead 49 will prevent the contact spring 88 from sliding off the terminal 47. The circuit board of contactor plate 15 may be assembled on body 13 by first attaching conductors 45 to terminals 47, 48 and then cementing the back surface of plate 15 to the body 13 with an epoxy bond or similar substance.

Figure 3:
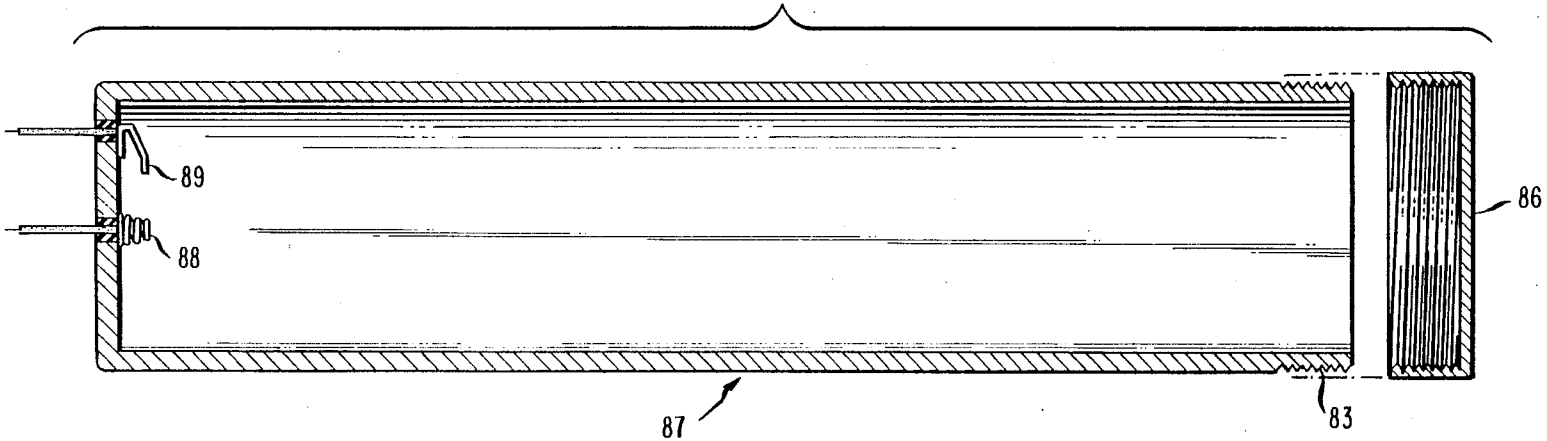
FIG. 3 is a sectional view of a typical battery housing.
Figure 4:
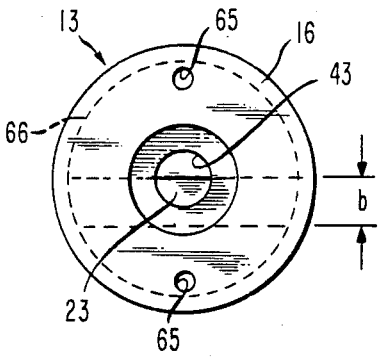
FIG. 4 is an end view of the device shown in FIG. 2.

Four conductors 46 extend through hole 43 from assembly 25 to a conventional female connector 51 having a threaded portion 53. Connector 51 may be a commercial BNC connector. The end cap 17, shown in section in FIG. 1, is cup-shaped with inner threads 52 and includes a central opening 55 for receiving the threaded portion 53 and apertures 63 for bolts 61. The cap 17, except for the openings therein, is generally configured to the shape of the battery housing cap 86 that is threaded onto battery housing 87 (FIG. 3).

A nut 57 is threaded onto portion 53 for fixing connector 51 to cap 17. Two of the conductors 46 are soldered or otherwise joined to the terminals of female connector 51. Two of the conductors 46 are attached to a light emitting diode (LED) 81 bonded to cap 17 at an opening 82. The hole 43 has an enlarged portion 59 for providing proper clearance for receiving connector 53, the nut 57, LED 81 and the attached conductors 46 when cap 17 is assembled onto portion 16 of body 13. Cap 17 is fixed to body 13 by a pair of bolts 61 and washers via apertures 63 in the cap 17 and threaded holes 65 in body 13. A rubber 0-ring 67 is fit into the space between the inner threaded portion 52 and the outer surface of portion 16. The housing 87 for holding the converter 11 has an outer threaded portion 83 that fits between the cap 17 and the outer surface of portion 16 to mate with the threads 52. When the cap 17 is threaded onto the portion 83, the portion 83 will press against 0-ring 67 thereby forming a seal.

A pair of identically shaped, thin-walled semi-cylindrical shell covers 68, 69 have the edges thereof supported by a pair of annular shoulders 64, 66. Small screws 62 pass through cut-outs 54 on covers 68, 69 into the threaded holes 56 on shoulders 64, 66.

The structure, including the covers 68, 69, and plate 15 is the physical equivalent of the battery being replaced. The terminals 47, 48 will make electrical contact with the corresponding contacts 88, 89 in the housing 87 in the same manner as do the battery terminals (not shown). The connector 51 is accessible to the exterior of housing 87 for connection to an external DC power source between 9 and 37 volts (not shown) by a conventional cable having a male connector.

Figure 5:
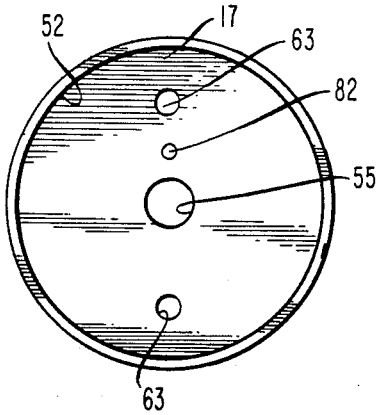
FIG. 5 is an end view of a portion of the device shown in FIG. 1.
Figure 6:
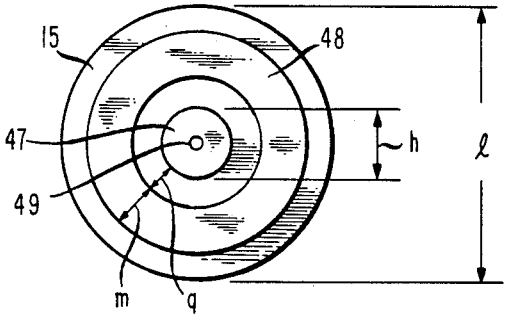
FIG. 6 is an end view showing details of still another portion of the device shown in FIG. 1.
Figure 7:
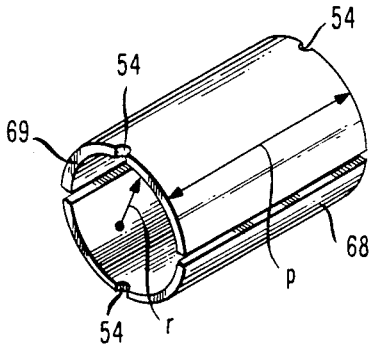
FIG. 7 is a pictorial view of portions of the device shown in FIG. 1.
Figure 8:
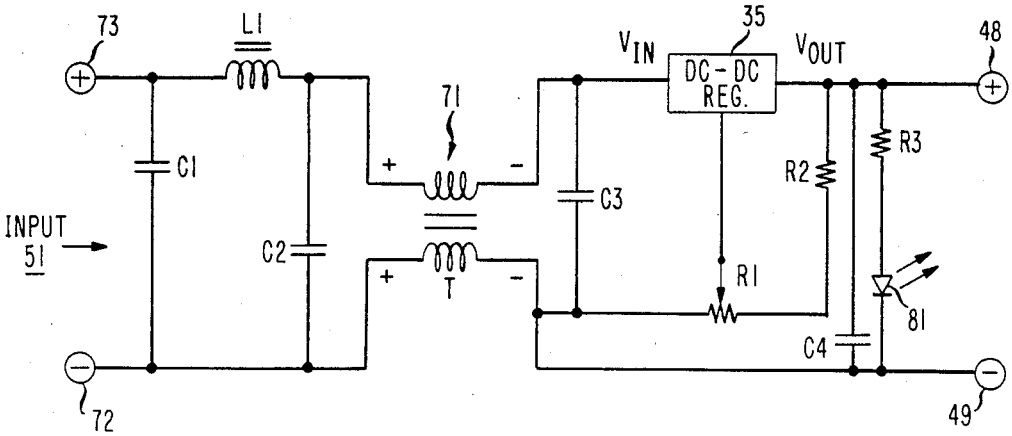
FIG. 8 is a schematic circuit diagram of the preferred circuit to be used with the device shown in FIG. 1.

With particular reference to FIG. 8 where circuit 71 is shown in detail, the connector 51 includes input terminals 72, 73 for connection to the negative and positive terminals, respectively, of the external DC power source. Capacitors C1 and C2, inductor L1 and transformer T suppress transients that may occur at the input terminals 72, 73. A pair of coils form the transformer T that has one end of the coils connected to either side of the capacitor C2 and the other end of the coils connected to either side of a capacitor C3. A commercial voltage regulator 35 has a voltage input terminal Vin connected to the node between one side of transformer T and capacitor C3. The voltage output terminal Vout of regulator 35 is connected to the outer terminal 48 on plate 15 (FIG. 5). A voltage divider circuit, formed by resistors R2 and potentiometer R1, is connected between the output terminal Vout and the other node between transformer T and capacitor C3. The moveable contact on potentiometer R1 is connected to regulator 35. An output capacitor C4 is connected across the voltage divider (R1 and R2). A series-connected resistor R3 and light emitting diode 81 are connected in parallel across capacitor C4 and terminals 48, 49. The voltage regulator 35 is preferably an integrated circuit that will sense changes in voltage across the voltage divider formed by resistors R1 and R2 and in response will automatically change its resistance so as to maintain a constant DC voltage at the output terminals 48, 49. The output voltage at terminal Vout is initially calibrated by adjusting potentiometer R1 and then fixing it in place by depositing a bonding agent thereon. The diode 81 will, of course, act as an indicator device by emitting light only when there is sufficient voltage present at the terminals 48, 49.

The circuit of FIG. 8 has the following preferred values for the various components thereof when used in a converter 11 as a substitute for the lithium organic cell #305226.

| | ELEMENT | VALUE OR PART NO. |
|---|---|---|
| Capacitor | C1 | .05 microfarad |
| Capacitor | C2 | 100 microfarads |
| Capacitor | C3 | .1 microfarad |
| Capacitor | C4 | 1 microfarad |
| Inductor | L | 100 microhenrys |
| Resistor | R1 | 5 kilo-ohms |
| Resistor | R2 | 240 ohms |
| Resistor | R3 | 330 ohms |
| Voltage Regulator | 35 | LM317 (1.5 AMPS) |

The transformer T is preferably wound with 22 gauge copper wire on a steel, ⅛ inch rod rolled into a toroid with a ⅜ inch diameter. The windings of transformer T may be wound of opposite sides of the toroid.

Typical values for the dimensions a–r are listed below. These values represent the preferred values for the converter 11 when used as a substitute for the lithium organic cell #305226.

| DIMENSION | SIZE IN INCHES |
|---|---|
| a | 1½ |
| b | ¼ |
| c | ⅜ |
| d | ⅜ |
| e | 2 |
| f | 2 |
| g | 3 3/16 |
| h | 1⅞ |
| i | 1/16 |
| j | ⅜ |
| k | ⅜ |
| l | 1½ |
| m | ¼ |
| n | ⅜ |
| p | 2¼ |
| q | 3/16 |
| r | ¾ |

It should be understood, of course, that the foregoing disclosure relates to only a preferred embodiment of the invention and that numerous modifications or alterations may be made therein without departing from the spirit and the scope of the invention as set forth in the appended claims.

The foregoing disclosure and drawings are merely illustrative of the principles of this invention and are not to be interpreted in a limiting sense. It is to be understood that the invention should not be limited to the exact details of construction shown and described because obvious modifications will occur to a person skilled in the art.

What is claimed is:

1. A DC power source converter comprising:

an elongated body having opposed first and second ends, and a chamber formed therein;

a first pair of electrical terminals mounted on the first end;

a second pair of electrical terminals mounted on the second end; and

DC-to-DC converter means mounted in said chamber and connected between said first and second pair of terminals for converting DC power applied to the first pair of terminals to a predetermined DC voltage at the second pair of terminals.

2. The converter of claim 1 wherein the body is generally cylindrical in shape.

3. The converter of claim 2 wherein first and second longitudinal bores extend through said body from said chamber to said first and second ends, respectively, and conductors extend through the bores to connect said DC-to-DC converter means to said terminals.

4. The converter of claim 2 wherein said first end includes a cover means for enclosing a housing in which said converter is to be mounted, and wherein said first pair of electrical terminals are mounted on said cover means.

5. The converter of claim 4 wherein said cover means includes a threaded cap.

6. The converter of claim 5 further including a DC voltage indicator mounted on said cap and connected to said DC-to-DC converter means.

7. The converter of claim 6 wherein said DC voltage indicator is a light emitting diode.

8. The converter of claim 1 further including a housing in which said body is mounted.

9. The converter of claim 8 wherein said first end includes a cover means for enclosing said housing and wherein said first pair of electrical terminals are mounted on said cover means.

10. The converter of claim 9 wherein said second pair of terminals includes an annular terminal surrounding a central terminal.

11. The converter of claim 10 wherein said cover means includes a threaded cap coupled to an open end of said housing.

12. The converter of claim 11 further including a DC voltage indicator mounted on said cap and connected to said DC-to-DC converter means.

* * * * *